United States Patent
Edwards et al.

(10) Patent No.: US 12,340,323 B2
(45) Date of Patent: Jun. 24, 2025

(54) SYSTEMS AND METHODS FOR CURATING ONLINE VEHICLE RESERVATIONS TO AVOID ELECTRIC VEHICLE BATTERY DEPLETION

(71) Applicant: Capital One Services, LLC, McLean, VA (US)

(72) Inventors: Joshua Edwards, Carrollton, TX (US); Tyler Maiman, Melville, NY (US); Samuel Yip, East Brunswick, NJ (US); Bryant Yee, Silver Spring, MD (US); Haytham Yaghi, Oakton, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 0 days.

(21) Appl. No.: 18/151,660

(22) Filed: Jan. 9, 2023

(65) Prior Publication Data

US 2024/0232730 A1    Jul. 11, 2024

(51) Int. Cl.
*G06Q 10/02*    (2012.01)
*B60L 53/66*    (2019.01)
(Continued)

(52) U.S. Cl.
CPC ............. *G06Q 10/02* (2013.01); *B60L 53/66* (2019.02); *B60L 53/68* (2019.02); *G06F 40/205* (2020.01); *G06F 40/40* (2020.01); *G06Q 50/40* (2024.01)

(58) Field of Classification Search
CPC .......... G07C 5/004; B60K 35/00; B60Q 9/00; G01C 21/3469; G01C 21/362;
(Continued)

(56) References Cited

U.S. PATENT DOCUMENTS

2012/0146582 A1    6/2012  Lei et al.
2018/0281612 A1*  10/2018  Perry ..................... H04W 4/80

FOREIGN PATENT DOCUMENTS

KR    102082452 B1    2/2020

OTHER PUBLICATIONS

"Evaluation of Accommodation Capability for Electric Vehicles of a Distribution System Considering Coordinated Charging Strategies" Published by energies (Year: 2019).*
(Continued)

*Primary Examiner* — Zeina Elchanti
(74) *Attorney, Agent, or Firm* — TROUTMAN PEPPER LOCKE LLP; Christopher J. Forstner; John A. Morrissett

(57) ABSTRACT

Disclosed embodiments may include a system for curating online vehicle reservations. The system may determine, from received vehicle data including first timing data and indicating a selected vehicle, that the selected vehicle is electric. The system may receive accommodation data including second timing data and indicating a selected accommodation. The system may determine, from comparing the first timing data to the second timing data, that the selected vehicle will likely require charging at the selected accommodation. The system may determine whether the accommodation data includes an indication of electric vehicle charging facilities. Responsive to determining that the selected accommodation does not provide the indication of electric vehicle charging facilities, the system may generate a first graphical user interface warning that no charging station is available for the selected vehicle at the selected accommodation and transmit the first graphical user interface to a user device for display.

20 Claims, 4 Drawing Sheets

(51) Int. Cl.
*B60L 53/68* (2019.01)
*G06F 40/205* (2020.01)
*G06F 40/40* (2020.01)
*G06Q 50/40* (2024.01)

(58) Field of Classification Search
CPC ............ G01C 21/3679; G01C 21/3697; G05B 19/042; G05B 19/048
USPC .......................................................... 705/5
See application file for complete search history.

(56) References Cited

OTHER PUBLICATIONS

Thornell, Carley, "Gas Prices Send Hotels Into Overdrive to Accommodate Electric Vehicles," Jun. 7, 2022 (https://skift.com/2022/06/07/gas-prices-send-hotels-into-overdrive-to-accommodate-electric-vehicles/).
Doll, Scooter, "Airbnb now lets you search for accommodations with EV chargers," Aug. 6, 2021 (https://skift.com/2022/06/07/gas-prices-send-hotels-into-overdrive-to-accommodate-electric-vehicles/).
https://www.plugshare.com/map/hotels (last accessed Jul. 14, 2022).
https://www.reservations.com/hotels/richmond-and-vicinity-virginia/amenity/electric-car-charging (last accessed Jul. 14, 2022).
https://www.expedia.com/lp/b/hotels-with-electric-vehicle-charging (last accessed Jul. 14, 2022).

* cited by examiner

SYSTEMS AND METHODS FOR CURATING ONLINE VEHICLE RESERVATIONS TO AVOID ELECTRIC VEHICLE BATTERY DEPLETION

FIELD

The disclosed technology relates to systems and methods for curating online vehicle reservations to avoid electric vehicle battery depletion. Specifically, this disclosed technology relates to monitoring inputs on a reservation website to identify a mismatched electric vehicle and accommodation reservation to warn or prevent the user from making the mismatched reservation in order to avoid usage of an electric vehicle that is likely to run out of battery charge.

BACKGROUND

Electric vehicles have become more and more prevalent in recent years, although the infrastructure for charging of such vehicles has not yet become ubiquitous. Electric vehicles are powered by electric batteries that require periodic recharging so that the vehicle can continue to be operated. Electric vehicles can be rented through various vehicle rental services, which typically take reservations via a website. Some such websites also allow users to book accommodation rentals, so that if, for example, a person is planning a trip to another city the person can book a vehicle rental and a hotel rental at the same time. In other instances, the person may access separate websites to separately book a vehicle and an accommodation. However, when reserving an electric vehicle or accommodation through a website, the vehicle and/or accommodation rental website(s) may fail to account for whether the rented vehicle will likely require charging during the trip and whether the selected accommodation provides charging facilities, which can lead to a situation where the rented vehicle runs out of charge unexpectedly, thereby severely negatively impacting the person's planned trip.

Accordingly, there is a need for improved systems and methods for curating online vehicle reservations to avoid electric vehicle battery depletion. Embodiments of the present disclosure are directed to this and other considerations.

SUMMARY

Disclosed embodiments may include a system for curating online vehicle reservations to avoid electric vehicle battery depletion. The system may include one or more processors, and memory in communication with the one or more processors and storing instructions that, when executed by the one or more processors, are configured to cause the system to provide for online vehicle reservation curation. The system may receive vehicle data comprising first timing data and indicating a selected vehicle. The system may determine, from the vehicle data, that the selected vehicle is electric. The system may receive accommodation data comprising second timing data and indicating a selected accommodation. The system may determine, from comparing the first timing data to the second timing data, that the selected vehicle will likely require charging at the selected accommodation. The system may determine whether the accommodation data associated with the selected accommodation comprises an indication of electric vehicle charging facilities. Responsive to determining that the selected accommodation does not provide the indication of electric vehicle charging facilities, the system may generate a first graphical user interface warning that no charging station is available for the selected vehicle at the selected accommodation and transmit the first graphical user interface to a user device for display.

Disclosed embodiments may include a system for curating online vehicle reservations to avoid electric vehicle battery depletion. The system may include one or more processors, and memory in communication with the one or more processors and storing instructions that, when executed by the one or more processors, are configured to cause the system to provide for online vehicle reservation curation. The system may receive vehicle data from a first email comprising first timing data and indicating a selected vehicle. The system may determine, from the vehicle data and first external vehicle data, that the selected vehicle is electric. The system may receive accommodation data from a second email comprising second timing data and indicating a selected accommodation. The system may determine, from comparing the first timing data to the second timing data, that the selected vehicle will likely require charging at the selected accommodation. The system may determine whether the accommodation data associated with the selected accommodation comprises an indication of electric vehicle charging facilities. Responsive to determining that the selected accommodation does not provide the indication of electric vehicle charging facilities, the system may generate a first graphical user interface warning that no charging station is available for the selected vehicle at the selected accommodation and transmit the first graphical user interface to a user device for display.

Disclosed embodiments may include a system for curating online vehicle reservations to avoid electric vehicle battery depletion. The system may include one or more processors, and memory in communication with the one or more processors and storing instructions that, when executed by the one or more processors, are configured to cause the system to provide for online vehicle reservation curation. The system may receive vehicle data comprising first timing data and indicating a selected vehicle. The system may determine, from the vehicle data, that the selected vehicle is electric. The system may receive accommodation data comprising second timing data and indicating a selected accommodation. The system may determine, from comparing the first timing data to the second timing data, that the selected vehicle correlates with the selected accommodation using a first machine learning model. The system may determine whether the accommodation data associated with the selected accommodation comprises an indication of electric vehicle charging facilities. Responsive to determining that the selected accommodation does not provide the indication of electric vehicle charging facilities, the system may generate a first graphical user interface warning that no charging station is available for the selected vehicle at the selected accommodation and transmit the first graphical user interface to a user device for display.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
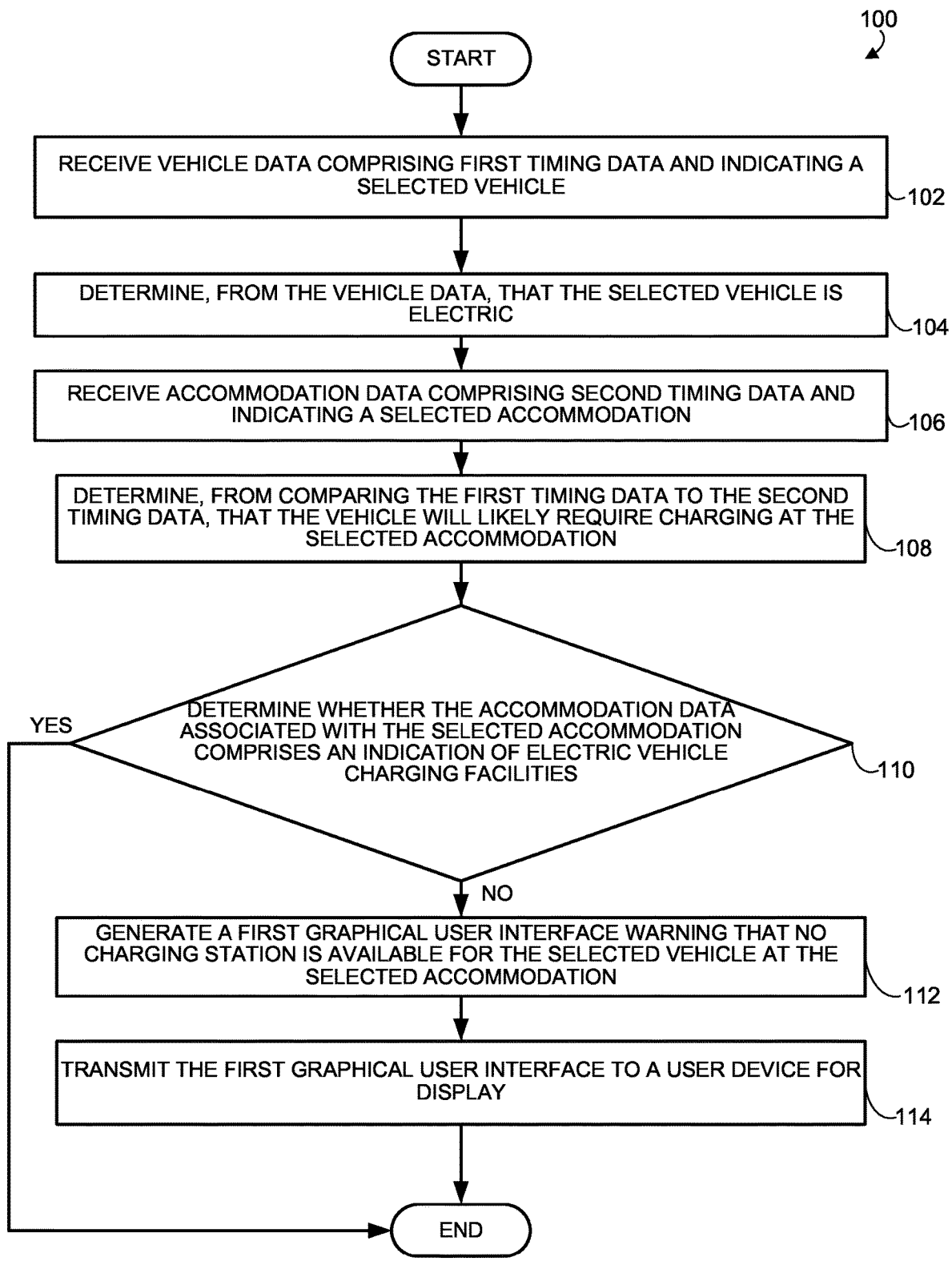
FIG. 1 is a flow diagram illustrating an exemplary method for curating online vehicle reservations in accordance with certain embodiments of the disclosed technology.

Examples of the present disclosure relate to systems and methods for curating online vehicle reservations to avoid electric vehicle battery depletion. Vehicles and accommodations (e.g., hotel rooms) can be rented through one or more websites that allow a user to reserve a vehicle, an accommodation, or both. In both the cases of separate vehicle/accommodation rental websites and a rental website that allows a user to rent both a vehicle and an accommodation, the underlying databases of vehicles and accommodations may or may not store all attributes of the vehicles and accommodations, such as whether the vehicle is electric and whether the accommodation provide electric vehicle charging facilities. However, in either case, such rental websites do not typically cross-reference the vehicle information stored in vehicle databases with accommodation information stored in accommodation databases in view of each other, or in view of details of a user's trip reservation, to determine whether the user's reservations may cause the user to be in a situation where a rented vehicle may be at risk of running out of charge during the user's trip. Thus, such vehicle/accommodation websites may not be capable of preventing or warning a user from making such incongruous vehicle/accommodation reservations. Accordingly, the disclosed technology relates to determining when a user has attempted (or already has) to rent an electric vehicle that is likely to require charging along with an accommodation that does not provide electric vehicle charging facilities and either preventing them from executing the mismatched reservations or at least warning the user of the mismatch and possibly providing the user with suggested modifications to the reservations to rectify the mismatch. The system may access and interface with different websites and data sources (e.g., a user's emails), using, for example, web scraping, optical character recognition, machine learning models and/or natural language processing to make determinations about whether a selected vehicle is an electric vehicle, whether the vehicle is likely to require charging during the user's trip and whether a selected accommodation provides electric charging facilities in order to curate a user's online vehicle/accommodation reservations to prevent or warn the user from making a mismatched reservation (i.e., reserving an electric vehicle that is likely to require charging and an accommodation that does not provide electric charging facilities). It is contemplated that the system described herein could be incorporated as part of a reservation website or software application (e.g., a reservation application executed on a smartphone) that can receive and process the user's inputs in near real-time to determine whether a reservation mismatch is present, incorporated as part of a web browser (e.g., via a plug-in or extension) that monitors the user's inputs into a reservation website in near real-time, or as a system that can monitor user data such as emails, text messages, calendar reminders and the like, to identify that a set of mismatched reservations has been made after the fact. In the former two cases, the system may present the user with a warning at the time the user is attempting to make the reservation (e.g., via a pop-up warning on the user's computing device) or possibly even prevent the user from executing the mismatched reservation. In the latter case, the system can provide the user with a warning after the fact (but prior to the start of the reservation) by for example, emailing the user a warning and providing the user with an opportunity to modify the reservation. In either case, the system can provide curation of vehicle and accommodation reservations within a single website platform or across multiple website platforms to identify whether a selected vehicle is an electric vehicle, identify whether a selected accommodation provides electric charging facilities and determine whether the vehicle is likely to need recharging so that an unexpected depletion of electric vehicle battery charge can be avoided.

Examples of the present disclosure related to systems and methods for curating online vehicle reservations to avoid electric vehicle battery depletion by automatically identifying a reservation mismatch and either warning the user about the mismatch or preventing the reservation from being made. The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details providing a warning of a mismatched reservation to a user via a GUI. This, in some examples, may involve monitoring reservation data input by a user and processing the data to determine whether a reservation mismatch has occurred and presenting the user with a warning GUI in real-time or near real-time to allow the user to modify the reservation prior to booking. According to some embodiments, some of the determinations made by the system in determining whether a reservation mismatch has occurred may be made utilizing machine learning models, which are a unique computer technology that involves training models to complete tasks and make decisions. Using a graphical user interface in this way may allow the system to warn or prevent a user from making a problematic reservation before the user executes the reservation or provide the user with a warning and possible means of modifying the problematic reservation in the case where the reservation has already been made by the user. This is an advantage and improvement over prior technologies that do not warn users of vehicle reservation mismatches because a user can end up renting an electric vehicle and an accommodation that does not support charging of the electric vehicle the user rented. The present disclosure may solve this problem by, for example, determining whether the reservation mismatch exists, presenting the user with a GUI to warn them of the mismatch and in some cases provide the user with suggested modifications to the reservation that will rectify the mismatch via the GUI. Furthermore, examples of the present disclosure may also improve the speed with which computers can book non-mismatched reservations by preventing or warning of mismatched reservations at the time the user is attempting to make the reservations. Overall, the systems and methods disclosed have significant practical applications in the field of electronic reservations because of the noteworthy improvements of the preventing problematic reservations, which are important to solving present problems with this technology by resulting in vehicle reservations that are not problematic to the user and reducing the computing load on the system by preventing problematic reservations that may then have to be modified in the future.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for curating online vehicle reservations, in accordance with certain embodiments of the disclosed technology. The steps of method 100 may be performed by one or more components of the system 400 (e.g., vehicle reservation curation system 320 or web server 410 of trip planning system 408 or user device 402), as described in more detail with respect to FIGS. 3 and 4.

In block 102, the vehicle reservation curation system 320 may receive vehicle data comprising first timing data and indicating a selected vehicle. The selected vehicle may be a make and model of a type of vehicle that a user may desire to rent or reserve. First timing data may indicate a time, a duration or a set of dates, for which the selected vehicle may be requested for reservation. For example, vehicle data may include "Ford Explorer" and "Mar. 1, 2022-Mar. 5, 2022," indicating that a user wishes to reserve a Ford Explorer for the timeframe of Mar. 1, 2022 to Mar. 5, 2022. In some embodiments, the selected vehicle may alternatively describe a general type of car, such as "4-door SUV," as opposed to a particular make and model.

According to some embodiments, the vehicle reservation curation system 320 may receive the vehicle data as it is entered into a reservation website, such as a website that allows a user to reserve vehicles, accommodations, and flights all in one place. In some embodiments, the website may be hosted by web server 410 and may be configured to collect the vehicle data as it is entered by a user and relay it to the vehicle reservation curation system 320. According to some embodiments, a web browser used by the user (e.g., via user device 402) may include a plug-in or browser extension that causes the web browser to monitor for when the user is at a vehicle reservation website and may relay the vehicle reservation information entered or selected by the user to the vehicle reservation curation system 320 in near real-time or after a reservation has been made by the user.

According to some embodiments, the vehicle data may be received from a first email that may include the first timing data and that may indicate a selected vehicle. For example, the vehicle reservation curation system 320 may be configured to access a user's stored emails and recognize emails that reflect the reservation of a vehicle, such as confirmations and/or receipts from vehicle rental organizations. The vehicle reservation curation system 320 may be configured to extract the first timing data and an indication of the selected vehicle from the email, using for example, natural language processing techniques. In some embodiments, the vehicle reservation curation system 320 may receive vehicle data from a server or device associated with a vehicle rental organization that identifies the user that reserved the vehicle.

In block 104, the vehicle reservation curation system 320 may determine, from the vehicle data, that the selected vehicle is electric. For example, in some embodiments, a data field associated with the selected vehicle (e.g., as listed on a website of a vehicle rental organization) may indicate that the selected vehicle is an electric vehicle. In some embodiments, the vehicle reservation curation system 320 may determine that the selected vehicle is an electric vehicle based on data in an email confirmation of the reservation and/or attached electronic receipt from the reservation by, for example, applying natural language processing techniques to the email/receipt to identify an indication that the vehicle is electric.

According to some embodiments, if data from the reservation website or email confirmation does not clearly indicate whether the selected vehicle is electric or not, the vehicle reservation curation system 320 may determine whether the selected vehicle is electric based on the vehicle data and using external information, such as data from other sources such as databases and/or websites. For example, if the vehicle data indicates that the selected vehicle is a "Ford Explorer," then the vehicle reservation curation system 320 may access a database of vehicles that lists makes and models of vehicles and lists whether they are electric vehicles or not. In some embodiments, the vehicle reservation curation system 320 may employ a web scraper that may automatically visit one or more websites describing the selected vehicle and determine whether the selected vehicle is electric by examining the content of the website (e.g., using natural language processing techniques to read a description of the vehicle on, for example, a manufacturer's website using a web scraper). In some embodiments, the vehicle reservation curation system 320 may access a vehicle build sheet provided by a manufacturer (e.g., via the manufacturer's website) that may specify whether a particular make and model vehicle is electric or not. Thus, in some embodiments, the determination that the selected vehicle is electric may be made from the external vehicle data (e.g., vehicle data from other databases or websites) in addition to the received vehicle data.

According to some embodiments, the trip planning system 408 may store records about known vehicles (i.e., known make and model) owned by customers and analyze transaction data (e.g., credit card data) of the associated customers to determine whether and how much gas the customers buy over time (e.g., based on whether the customer has executed transactions at merchants known to be gas stations). In other words, if it is known that a particular customer has a particular make and model vehicle but has not bought gas in a year, it can be surmised that that particular make and model vehicle is an electric vehicle. Thus, in some embodiments, the vehicle reservation curation system 320 may determine whether a selected vehicle is an electric vehicle or not by comparing the make and model of the vehicle to the stored records of known vehicles that have been determined to be electric or not based on associated transaction data.

According to some embodiments, the vehicle reservation curation system 320 may determine that the selected vehicle is electric using a first machine learning model. For example, according to some embodiments, a machine learning model can be trained using pictures of vehicles that are either known to be electric vehicles or known to not be electric vehicles and a photo of the selected vehicle (e.g., provided by the vehicle reservation website) may be used as an input to the trained model to generate a prediction/determination about whether the selected vehicle is an electric vehicle or not. According to some embodiments, a machine learning model may be trained to visually recognize aspects of a vehicle, such as the plug specifications, vehicle brand, type of vehicle, vehicle color, and vehicle body shape, which may be features that may potentially be used to determine if the selected vehicle is electric or not. For example, indications that may indicate that a vehicle is electric may include the presence of a plug on the vehicle, a particular make and/or model of a vehicle and/or a particular body shape of vehicle (e.g., electric vehicles may tend to have a more rounded appearance than non-electric vehicles). Thus, according to some embodiments, the first machine learning model may be trained using images of vehicles that are known to be electric or not electric, may receive one or more images of the selected vehicle as input and may output an indication of whether the selected vehicle is an electric vehicle or not.

In some embodiments, the first machine learning model may be trained to determine whether the selected vehicle is electric or not based on a textual description of the vehicle. For example, the first machine learning model may be trained using text, such as vehicle specifications and/or vehicle descriptions, that is associated with a plurality of vehicles that are known to be electric vehicles or not, may receive a textual description of the vehicle (e.g., obtained from the reservation website or manufacturer's website) as input, and may output an indication of whether the selected vehicle is electric or not. The textual description may include a description of the vehicle in prose and/or may include a list of specifications of the vehicles (e.g., as provided by a manufacturer's build sheet).

In block 106, the vehicle reservation curation system 320 may receive accommodation data comprising second timing data and indicating a selected accommodation. The selected accommodation can be an accommodation, such as for example a hotel room or short term house rental, that the user wishes to reserve for a period of time. According to some embodiments, the accommodation data may include an address, a name of a hotel, and/or other information about the accommodation, such as whether parking is included with the reservation and/or whether the parking associated with the accommodation includes equipment or outlets to allow for electric charging of an electric vehicle. The second timing data can indicate the period of time (e.g., a range of dates) for which the user wishes to reserve the selected accommodation.

According to some embodiments, the accommodation data can be received by the vehicle reservation curation system 320 in similar manners to those described above in block 102 with respect to receiving vehicle data. For example, the accommodation data can be received as it is entered into a reservation website and/or from an email. Thus, in some embodiments, the accommodation data can be received from a second email.

In block 108, the vehicle reservation curation system 320 may determine, from comparing the first timing data to the second timing data, that the selected vehicle will likely require charging at the selected accommodation. According to some embodiments, the vehicle reservation curation system 320 may determine that the selected vehicle will require charging using coded rules. For example, one rule may indicate that if the vehicle is being rented for more than a specified amount of time and/or number of days (e.g., 3 days), than it will likely need recharging. In some embodiments, rules can be based on attributes of the selected vehicle. For example, there may be different rules for electric vehicles having batteries of different capacity sizes, with vehicles having smaller capacity batteries being designated to be likely to require charging in less days than a vehicle having a larger capacity battery. In some embodiments, the vehicle reservation curation system 320 may include rules that can determine whether the vehicle will likely require charging based on an expected mileage the vehicle is expected to travel, as determined based on for example, historical mileage data associated with the user based on previous trips, average mileages at the location(s)/city the vehicle is being rented at based on the duration of the vehicle rental, and/or a travel itinerary of the user. A travel itinerary can be submitted to vehicle reservation curation system 320 by a user, can be derived from mileage between multiple reservations (e.g., the user is going to city A for one day, then driving to city B for one day, then to city C) or can be derived from an itinerary in the user's calendar or email. According to some embodiments, the vehicle reservation curation system 320 may use other data to determine whether the selected vehicle will require charging, such as the time of day the vehicle is being rented (i.e., a mid-day rental may require charging by night), the amount of expected mileage traveled by the vehicle that is on highway roads versus city roads (the latter being expected to deplete more charge per mile), an expected number of passengers and/or weight added to the vehicle, weather conditions, battery degradation/age or any other such information that may be useful in making the determination. Another feature that may be considered in the determination is the location of the rental. For example, if a user is renting a car in a city that is larger and/or more geographically spread out, the vehicle may be expected to travel more miles than if the vehicle was rented in a city that is smaller and/or more geographically condensed.

According to some embodiments, the vehicle reservation curation system 320 may determine that the selected vehicle will require charging using a second machine learning model. In some embodiments, the second machine learning model may use inputs of the vehicle data to determine a vehicle type, the accommodation data to determine an accommodation type, the first timing data, and the second timing data. For example, in some embodiments, the second machine learning model may receive the vehicle data and accommodation data entered on a reservation website and using a machine learning model, may output a prediction indicating whether the selected vehicle is likely to require charging at the selected accommodation. In some embodiments, the output may be a binary indication or alternatively it may be a probability that the vehicle will require charging during the planned trip. According to some embodiments, the second machine learning model may be trained to output an expected mileage the vehicle can travel based on a current charge of the battery of the vehicle and that expected mileage can be compared to an expected mileage that the user is expected to travel during their trip (e.g., based on an itinerary or estimates based on the duration of the reservation) to determine whether the selected vehicle is likely to require charging.

According to some embodiments, the second machine learning model may be trained using data associated with previous trips other users have taken, which may include data about the make/model of the vehicle driven on the trip, the mileage, the starting and ending charge of the battery, the amount of time the vehicle was driven, the amount of time the vehicle was rented, the location(s) at which the vehicle was rented or driven (e.g., as determined by GPS data), and whether and when the vehicle was charged (e.g., as determined based on transaction data, GPS data or vehicle data indicating charging has taken place), whether the vehicle was ever charged, whether the vehicle's charge fell below a predetermined threshold representing a precarious level of low charge and/or what the change in charge of the vehicle was over time and/or over mileage (e.g., as determined by GPS tracking of location and vehicle tracking of the stored charge over time). In other words, based on known data of previous trips, the model can be trained to determine an indication of whether the selected vehicle is likely to need to be recharged during a future trip based on the reservation data input by the user and/or data extrapolated from the reservation data, such as other details about the selected vehicle, location(s) the user will drive such as projected traffic and weather data based on the location(s) and dates, and other such information. The model can be validated using testing data to ensure that it has a minimum desired level of success at predicting whether a vehicle would or would not have needed to have been charged during a duration of a reservation.

Thus, in some embodiments, the second machine learning model may receive as inputs, one or more of the make/model of the selected vehicle, the expected mileage the vehicle will travel, the duration of the rental, the location(s) of the rental, the starting charge of the battery of the selected vehicle (if known) and other such inputs about the vehicle, and may output a prediction indicating whether the vehicle is likely to require charging during the trip. The expected mileage the vehicle will travel can be determined by the vehicle reservation curation system 320 based on historical data of previous trips the user has taken and/or historical data from other users (e.g., a typical person who visits Atlanta for 3 days drives on average 38 miles as determined based on mileage listed in receipts of previous rentals). In some embodiments, the second machine learning may also have been trained on and subsequently receive as inputs, location-based and/or environmental inputs, such as projected weather, traffic and events at the location during the time of the reservation, which may impact battery usage of the vehicle while traveling. According to some embodiments, the second machine learning model may be trained to output an estimated remaining amount of miles that the selected vehicle may travel before requiring a charge, and the vehicle reservation curation system 320 may determine a prediction about whether the vehicle will require a charge by comparing the remaining miles to the expected miles (e.g., based on the user's itinerary). Specifically, if the remaining miles are less than the expected miles, then the vehicle reservation curation system 320 may determine that the selected vehicle is likely to need a recharge during the duration of the reservation.

In some embodiments, the second machine learning model may take in accommodation data associated with alternative accommodations as inputs and for each of accommodation input into the model, output a probability that the vehicle will require charging so that a user can compare various options. In some embodiments, the second machine learning model may be an ensemble model that includes a plurality of machine learning models whose outputs may be combined into a final prediction about whether the selected vehicle is likely to require charging during the reserved trip.

According to some embodiments, this can be performed in near real-time as the user enters data into a reservation website. In some embodiments, it can be determined after the reservations have already been made, for example, based on data obtained from email confirmations. According to some embodiments, a machine learning model may take other data into account in determining whether the selected vehicle will require charging, such as historical travel data/driving mileage of the user (i.e., how much the user typically drives based on previous trips), historical data about the make/model of the selected vehicle (i.e., data reflective of how often charging of that type of vehicle is typically required), and other data that may impact driving conditions, such as historical/expected traffic data, event data (e.g., if large crowds are expected at the location of the accommodation due to a sporting or other large entertainment event) expected weather data, and data relating to other travel conditions.

In block 110, the vehicle reservation curation system 320 may determine whether the accommodation data associated with the selected accommodation includes an indication of electric vehicle charging facilities. According to some embodiments, a data field associated with a particular accommodation listing may explicitly indicate whether the accommodation includes electric vehicle charging facilities and thus, the vehicle reservation curation system 320 may be able to make the determination based on metadata associated with the listing. In other words, according to some embodiments, the vehicle reservation curation system 320 may utilize metatags to determine whether the accommodation data associated with the selected accommodation include the indication of electric vehicle charging facilities. In some embodiments, determining whether the accommodation data associated with the selected accommodation may include the indication of electric vehicle charging facilities may be done by using natural language processing to parse data of a web page or listing. For example, if the website listing of an accommodation that is offered for rent doesn't include metadata that explicitly indicates whether or not the accommodation includes an electric charging station, the vehicle reservation curation system 320 may be configured to utilize a web crawler to obtain text data from a website, such as for example, the website of a hotel corresponding to the selected accommodation, and applying natural language processing techniques to the text data to determine whether the hotel includes a charging station. For example, it is common for hotel websites to have a description page that describes the hotel and/or an amenities page that describes the amenities provided and such pages may include a description of the presence of one or more electric charging stations.

According to some embodiments, the vehicle reservation curation system 320 may prevent a reservation with the selected accommodation and the selected vehicle in response to determining that the selected accommodation does not provide electric vehicle charging facilities. For example, in some embodiments, where the vehicle reservation curation system 320 receives vehicle data and accommodation data in near real-time by monitoring such data as it is input into a reservation system, the vehicle reservation curation system 320 may determine that the vehicle selected by the user is an electric vehicle but the accommodation selected by the user does not provide an electric charging station, and thus the vehicle reservation curation system 320 may prevent the user from booking the conflicting reservation(s) by, for example, causing the reservation website to reject one or the reservations when the user tries to finalize or book the reservation. This may occur when aspects of the vehicle reservation curation system 320 are integrated as part of the reservation website or when aspects of the vehicle reservation curation system 320 are integrated into a browser plug-in or extension that monitors the user's web browsing activity on reservation websites. In the case of a browser extension, the browser extension may cause the browser to prevent navigation to a webpage for finalizing/booking the reservation in response to the vehicle reservation curation system 320 determining that there is a reservation mismatch (i.e., the reserved car is an electric car but the reserved accommodation does not have an electric charging station). In this case, the browser extension may instead, for example, cause the browser to display a warning page informing the user of the mismatch and that the vehicle reservation curation system 320 has prevented the user from finalizing the reservation. In some embodiments, an automatic prevention of the reservation by the vehicle reservation curation system 320 may be overridden by the user, by for example, the user selecting an override button presented on the warning page.

According to some embodiments, the vehicle reservation curation system 320 may, in response to determining that the selected accommodation does not provide the indication of electric vehicle charging facilities, determine whether an alternative accommodation that provides electric vehicle charging facilities is available and change the selected accommodation to the alternative accommodation in response to determining that the alternative accommodation is available. In some embodiments, the vehicle reservation curation system 320 may automatically change the selected accommodation to the closest equivalent accommodation within a predetermined distance of the selected accommodation. For example, if the selected accommodation is a two bedroom hotel room in the $150-$200/night price range, then the vehicle reservation curation system 320 may automatically select the closest two bedroom hotel room in the $150-$200/night price range within a 1 mile radius of the selected accommodation that has a charging station. According to some embodiments, the vehicle reservation curation system 320 may present the user with a plurality of similar accommodation options based on the attributes of the accommodation (e.g., number of beds, cost per night, same hotel chain, etc.) that all have associated charging stations and allow the user to select an alternative accommodation from the options presented.

In some embodiments, determining whether a selected vehicle is electric and/or determining whether a selected accommodation includes an indication of electric vehicle charging facilities may be achieved using one or more machine learning models that can use external data (i.e., data relating to vehicles and accommodations that are not the selected vehicle and the selected accommodation). For example, if it is unclear from the received vehicle data and received accommodation data whether the vehicle and accommodation are electric or have a charging station, then the vehicle reservation curation system 320 may make this determination based on external vehicle data and external accommodation data. Such data could include, for example, text from websites describing details about the make and model of the selected vehicle, text from an accommodation website (e.g., a hotel website) describing the accommodation, text from accommodation and/or vehicle review websites describing other users' experiences with the selected accommodation and/or selected vehicle, or other such external vehicle and accommodation data that may be useful in making such determinations. As will be understood by those of skill in the art, one or more machine learning models may be trained using, for example, text relating to vehicles that are known to be electric or not (e.g., vehicle descriptions on one or more websites) and text relating accommodations that are known to have charging stations or not (e.g., hotel descriptions on one or more websites), and such models can then make predictions about whether a selected vehicle is electric or a selected accommodation has a charging station based on text relating to the vehicle/accommodation being input into the trained model(s). According to some embodiments, the first external vehicle data and external accommodation data may be acquired by a machine learning model compiling data from a number of different users or sources (e.g., different websites).

In block 112, the vehicle reservation curation system 320 may generate a first graphical user interface warning that no charging station is available for the selected vehicle at the selected accommodation in response to determining that the selected accommodation does not provide the indication of electric charging facilities. According to some embodiments, the first graphical user interface may suggest changes including a different accommodation with electric vehicle charging facilities or a hybrid electric vehicle option. In some embodiments, the first graphical interface warning may be generated in near real-time in response to a user's attempt to book mismatched reservations via a website. In some embodiments, the first graphical interface warning may be generated after a mismatched set of reservations has already been made, as determined by for example, an analysis of confirmation emails and/or receipts providing details of the reservations. According to some embodiments, the graphical user interface warning may provide the user with suggested charging stations that the user may use to charge the vehicle during their trip, for example based on the location of the vehicle reservation, the location of one or more of the reserved accommodations or expected driving routes between accommodations or based on a user's itinerary. For example, the graphical user interface warning may provide the user with a map that shows the locations of public charging stations that the user may utilize as part of their trip. Thus, even if the vehicle reservation curation system 320 determines that the selected vehicle is electric, that charging will likely be required and that the selected accommodation does not provide electric charging facilities, the user may nonetheless opt to proceed with the reservation as-is based on the information provided regarding the availability of public electric charging stations in locations that the user may find convenient to utilize.

In block 114, the vehicle reservation curation system 320 may transmit the first graphical user interface to a user device for display. In some embodiments, the first graphical user interface may be displayed by a user device 402 in conjunction with a web browsing experience in connection with the user's attempt to book a reservation of a selected vehicle and selected accommodation. According to some embodiments, a reservation website hosted by web server 410 and interacting with the vehicle reservation curation system 320 may display the first graphical user interface warning. In some embodiments, a web browser that is running a plug-in/extension that interacts with the vehicle reservation curation system 320 may cause the display of the first graphical user interface to occur. According to some embodiments, a software application running on user device 402 may cause the display of the first graphical user interface warning, in response to, for example, determining that no charging station is available for the selected vehicle at the selected accommodation based on an analysis of prior reservations as indicated by confirmation emails and/or receipts. In some embodiments, the first graphical user interface may be transmitted to the user device 402 for display via email. For example, if the vehicle reservation curation system 320 makes the determination that a mismatched set of reservations has already been made (e.g., based on an analysis of confirmation emails), then the vehicle reservation curation system 320 may email the first graphical user interface to the user device 402 for display at the user's convenience.

According to some embodiments, the vehicle reservation curation system 320 may be part of a travel reservation portal, a browser extension, or combinations thereof, and wherein the selected accommodation is a non-traditional accommodation. A non-traditional accommodation may be an accommodation that is a house or other dwelling that is being used as a short term rental by the owner, whereas a traditional accommodation may be a hotel, motel or bed and breakfast.

According to some embodiments, the vehicle reservation curation system 320 may, in response to determining that the selected accommodation does not provide the indication of electric vehicle charging facilities, determine whether an alternative accommodation that provides electric vehicle charging facilities is available. For example, in some embodiments, the vehicle reservation curation system 320 may search a database of accommodations that are known to include electric vehicle charging facilities and that are available to rent during the timeframe selected by the user and select one or more alternative accommodations to present to the user that are within a specified distance from the selected accommodation (e.g., alternative accommodations within 3 miles of the originally selected accommodation). According to some embodiments, the one or more alternative accommodations may or may not be filtered by the vehicle reservation curation system 320 based on one or more degrees of similarity between aspects of the selected accommodation and aspects of the alternative accommodations. For example, the vehicle reservation curation system 320 may filter the alternative accommodations based on one or more of a same number of beds/bedrooms, a price range and one or more amenities in common (e.g., whether they both have a pool and/or a gym). In response to determining that the alternative accommodation is available, the vehicle reservation curation system 320 may generate a second graphical user interface including a message to a user regarding switching to the alternative accommodation and transmit the second graphical user interface to the user device. For example, in some embodiments, the vehicle reservation curation system 320 may cause user device 402 to display one or more proposed alternative accommodations and allow the user to select one for reservation.

According to some embodiments, the vehicle reservation curation system 320 may change the selected vehicle to a hybrid electric vehicle or internal combustion engine vehicle in response to determining that the alternative accommodation is not available. For example, according to some embodiments, if the vehicle reservation curation system 320 determines there are no available alternative accommodations having electric vehicle charging facilities within the predetermined range of the originally selected accommodation, the vehicle reservation curation system 320 may then search for alternative available vehicles for rent during the specified timeframe that will not rely on an electric charging station for continued operation. According to some embodiments, the vehicle reservation curation system 320 may, for example, search a database or listings (e.g., using natural language programming) associated with vehicle rental organizations within a predetermined distance (e.g., 1 mile) of the originally selected vehicle or a pickup location associated with the originally selected vehicle. For example, if the originally selected vehicle was to be picked up at an airport, the vehicle reservation curation system 320 may then search listings of other available non-electric vehicles at that airport. According to some embodiments, the vehicle reservation curation system 320 may generate a third graphical user interface asking the user if they would like to switch to an alternative vehicle and transmit the third graphical user interface to the user device (e.g., user device 402) in response determining that the alternative accommodation is not available.

According to some embodiments, the second and/or third graphical user interface can be generated and presented to a user in near real-time as they are in the processing of making an online reservation at a website. Thus, for example, if a user is using a web based reservation service that allows a user to book a vehicle and an accommodation, the vehicle reservation curation system 320 may detect a mismatch as the user inputs their selections and present the user with an option to change either the vehicle or the accommodation to a suggested alternative before the user completes the booking (e.g., before they pay for the reservation). This can be achieved as an integrated feature of the reservation website or using a third-party plug-in/extension installed on a user's browser. In some embodiments, the vehicle reservation curation system 320 may present the second and/or third graphical user interfaces to the user after the original mismatched reservation has been made, by for example, detecting the mismatch based on confirmation emails/receipts in the user's email inbox. In this case, in some embodiments, the vehicle reservation curation system 320 may email or text the second and/or third graphical user interfaces (or links thereto) to the user, which can then facilitate a cancellation and/or modification to the previously booked vehicle and/or accommodation reservations to modify the reservation to book one of a suggested alternative vehicle(s) and/or accommodation(s).

Figure 2:
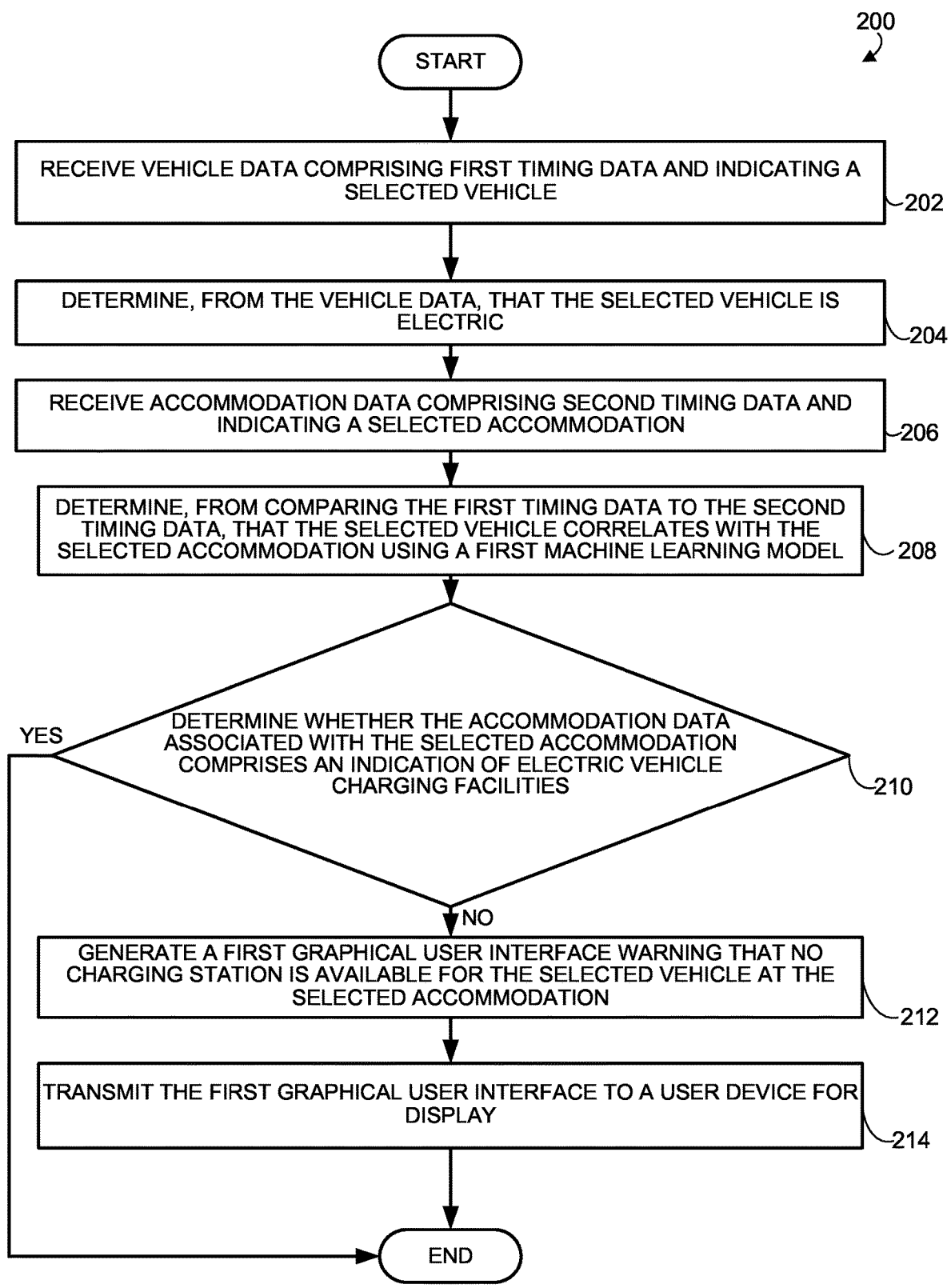
FIG. 2 is a flow diagram illustrating an exemplary method for curating online vehicle reservations in accordance with certain embodiments of the disclosed technology.

FIG. 2 is a flow diagram illustrating an exemplary method 200 for curating online vehicle reservations, in accordance with certain embodiments of the disclosed technology. The steps of method 200 may be performed by one or more components of the system 400 (e.g., vehicle reservation curation system 320 or web server 410 of trip planning system 408 or user device 402), as described in more detail with respect to FIGS. 3 and 4.

Method 200 of FIG. 2 is similar to method 100 of FIG. 1. The descriptions of blocks 202, 204, 206, 210, 212, and 214 in method 200 are similar to the respective descriptions of blocks 102, 104, 106, 110, 112, and 114 of method 100 and are not repeated herein for brevity. However, block 208 is different from block 108 and is described below.

In block 208, the vehicle reservation curation system 320 may determine, from comparing the first timing data to the second timing data, that the selected vehicle correlates with the selected accommodation using a first machine learning model. For example, in a case where a user books a vehicle reservation beginning on May 1, 2022 in city A and an accommodation reservation beginning on May 5, 2022 in city B, it may be unclear whether these reservations correlated to the same trip or separate trips. Perhaps the user plans to stay in city A for a few days and then catch a ride with a friend to city B, in which case determining whether there is a reservation mismatch is unnecessary. Alternatively, perhaps the user may stay in city A for a few days and then plans to drive to a hotel in city B and park at the hotel, in which case it would be desirable to determine whether there is a reservation mismatch. According to some embodiments, the vehicle reservation curation system 320 may determine whether the two reservations are correlated based on the duration of the reservation and the distance between the accommodations. For example, if the vehicle is being rented for 2 days, and the first accommodation is in New York City and the subsequent reservation is in Los Angeles, the vehicle reservation curation system 320 may determine that the two reservations are not correlated because the approximately 2,800 miles between the two cities takes approximately 41 hours to drive, which, is too long to reasonably drive in the 2 days of the vehicle reservation.

In some embodiments, the vehicle reservation curation system 320 may use one or more machine learning models to determine whether reservations of a selected vehicle and more than one accommodation are correlated. In other words, in some embodiments, the vehicle reservation curation system 320 may include a machine learning model that may, for example, predict a likelihood of the user using a selected vehicle for two or more accommodation reservations. In some embodiments, the inputs of the machine learning model may include duration of the vehicle reservation, duration of time between the dates of the reserved accommodations, driving distance between reserved accommodations, locations of the accommodations (e.g., certain cities may be difficult to navigate without a vehicle, therefore increasing the likelihood of use of a reserved vehicle), geographical coverage and cost of public transportation, and other inputs that may be useful in determining whether a single vehicle reservation may be intended to be used to travel to more than one reserved accommodation. According to some embodiments, such a machine learning model may be trained using data associated with previous other users' trips that involved multiple accommodations and a single vehicle reservation in which it is known whether the single vehicle was used to travel to the multiple accommodations or not (e.g., based on GPS data of the vehicle or other data indicative of whether the used drove the vehicle to the accommodations such as the location(s) of merchants at which credit card transactions were processed during the duration of the vehicle reservation). According to some embodiments, the machine learning model may output a likelihood that the user intends to travel to the multiple accommodations using the selected vehicle. According to some embodiments, if the likelihood exceeds a predetermined threshold, then the vehicle reservation curation system 320 may factor the trip to the one or more additional accommodations into its determination of whether the selected vehicle is likely to require recharging during the trip, whereas if the likelihood is less than the predetermined threshold then the vehicle reservation curation system 320 may assume that the selected vehicle will not leave the vicinity proximate the first accommodation reservation when making a determination regarding whether the vehicle is likely to require charging or not.

According to some embodiments, the vehicle data and the accommodation data may be received from transaction data from a transaction card. For example, in some instances, merchants may provide some details about a transaction to a financial service provider associated with a transaction card, such as for example, the identification of a hotel or rental car booked by a user and associated dates each was booked. This information may be conveyed in transaction data sent to the financial service provider in association with a transaction. In some embodiments, the vehicle reservation curation system 320 may derive the vehicle data and the accommodation data from this transaction data by for example, extracting it from defined fields of the transaction data or applying natural language processing techniques to the financial data to identify such data.

According to some embodiments, the vehicle reservation curation system 320 may determine, after a predetermined period of time, whether the selected accommodation or the selected vehicle have been changed and, in response to determining that the selected accommodation or the selected vehicle have not been changed, the reservation mismatch detection system 320 may generate a second graphical user interface warning reminding a user that no charging station is available for the selected vehicle at the selected accommodation and transmit the second graphical user interface to the user device for display. The predetermined amount of time may be measured from the time the first graphical user interface warning was generated and/or displayed to the user (e.g., via user device 402). The predetermined amount of time may be any amount of time in which the user may reasonably be expected to change the selected accommodation or selected vehicle, such as, for example, 30 seconds, 1 minute, 2 minutes, 3 minutes, 4 minutes, 5 minutes, 10 minutes, or any other specified amount of time. According to some embodiments, the second graphical user interface may provide the user with one or more selectable alternative accommodations or vehicles that, when selected, avoid a mismatch between the selected vehicle and selected accommodation.

It is contemplated that not all electric vehicles may be compatible with all charging stations. In other words, it is anticipated that it may be the case that certain makes/models of electric vehicles may only be compatible with certain types of charging stations. Further, even if compatible, certain vehicles and charging stations may have different characteristics than others, such as for example, the speed at which the charging station may charge the vehicle. Thus, it should be understood that in various embodiments, such compatibilities and differing characteristics may be accounted for by the vehicle reservation curation system 320 and/or various models that are used by the vehicle reservation curation system 320. For example, if the vehicle reservation curation system 320 determines that a selected vehicle is an electric vehicle and a selected accommodation includes a charging station, but that the particular type of charging station provided by the accommodation is incompatible with the selected vehicle, then the vehicle reservation curation system 320 will present a warning as though the accommodation does not provide any electric charging station at all. Thus, it is contemplated that the various techniques described herein may be modified to identify and account for differing types of electric vehicles and charging stations as may be necessary to make determinations regarding reservation mismatches. Further, although this disclosure is generally directed to electric vehicles and electric charging stations, it is further contemplated that the techniques described herein could be applied to other types of vehicles and fuel sources as may be used in the future, such as for example, vehicles that run on hydrogen, biofuel, various gases or any other alternative fuels that may be utilized in the future.

Figure 3:
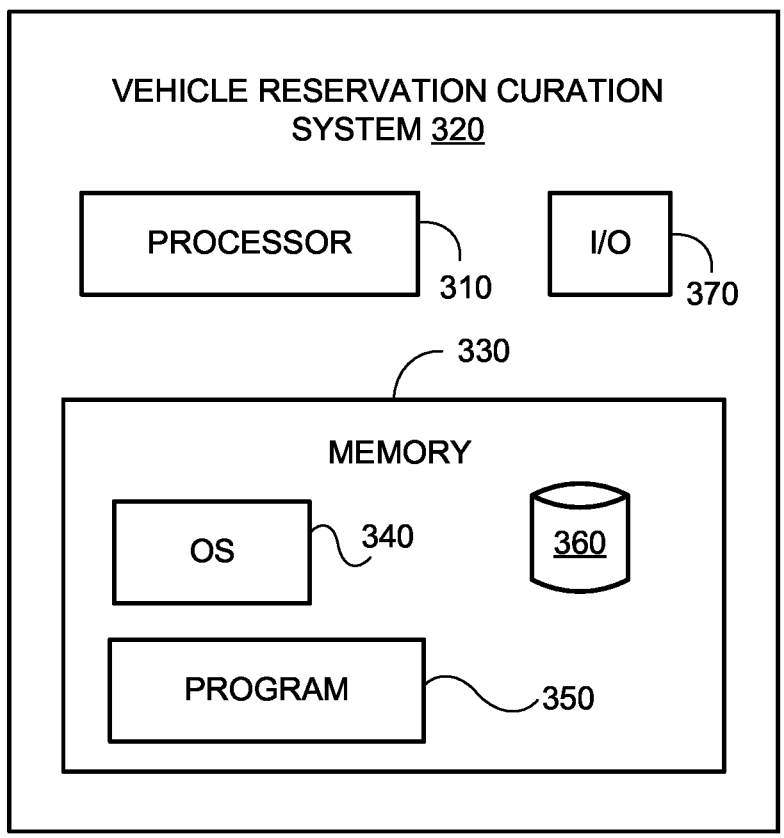
FIG. 3 is block diagram of an example vehicle reservation curation system used to provide curation of online vehicle reservations, according to an example implementation of the disclosed technology.
Figure 4:
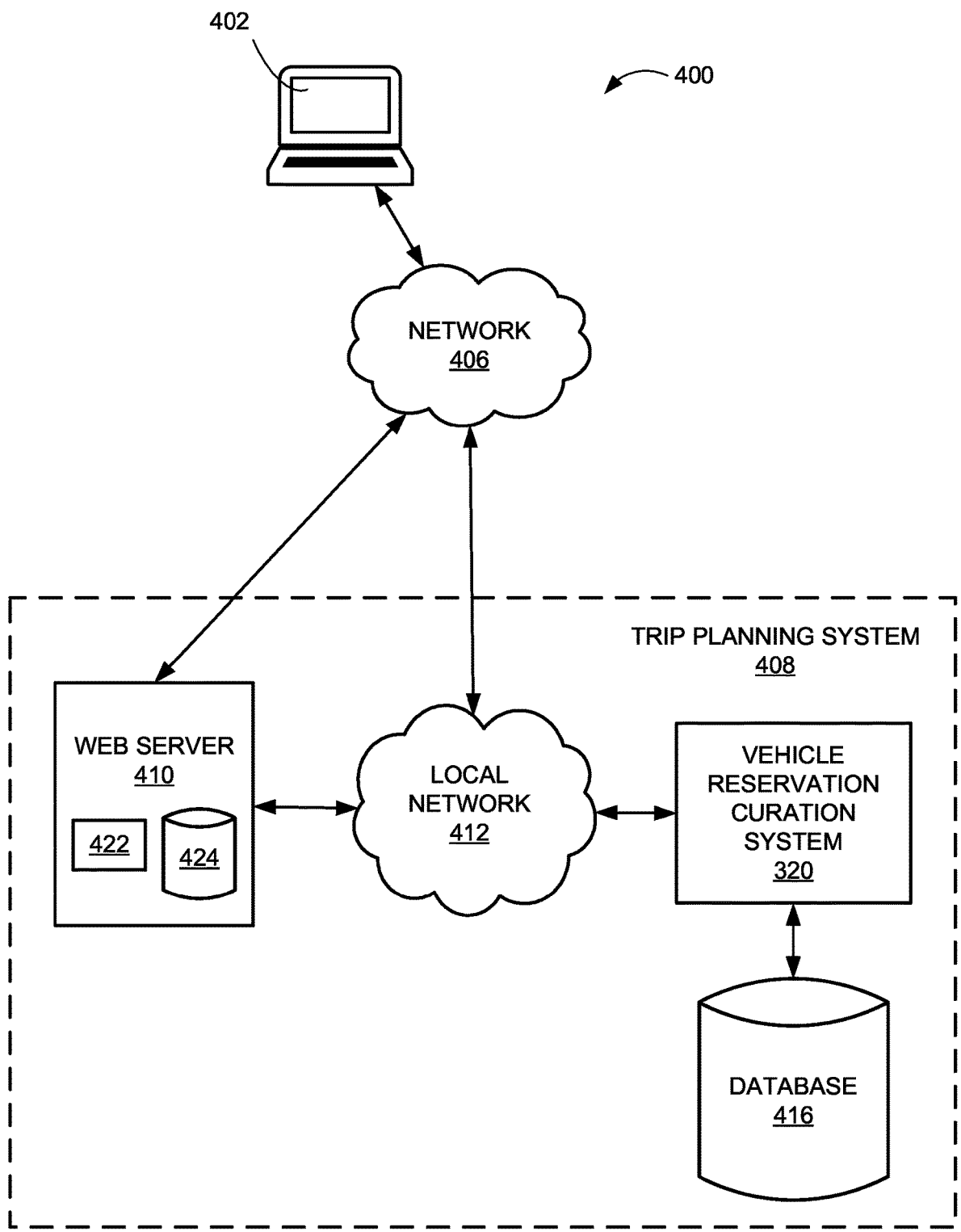
FIG. 4 is block diagram of an example system that may be used to provide curation of online vehicle reservations, according to an example implementation of the disclosed technology.

FIG. 3 is a block diagram of an example vehicle reservation curation system 320 used to determine whether a mismatch exists between a selected vehicle and a selected accommodation according to an example implementation of the disclosed technology. The system may determine a mismatch exists when, for example, the selected vehicle is an electric vehicle that is likely to require charging during the user's trip and the selected accommodation does not have electric vehicle charging facilities. The vehicle reservation curation system 320 may be configured to provide a warning to a user that a mismatch has been detected and, in some embodiments, the system may be configured to provide one or more suggested alternative vehicles and/or accommodations that a user may select as a replacement to eliminate the mismatch. According to some embodiments, the user device 402 and web server 410, as depicted in FIG. 4 and described below, may have a similar structure and components that are similar to those described with respect to vehicle reservation curation system 320 shown in FIG. 3. As shown, the vehicle reservation curation system 320 may include a processor 310, an input/output (I/O) device 370, a memory 330 containing an operating system (OS) 340 and a program 350. In certain example implementations, the vehicle reservation curation system 320 may be a single server or may be configured as a distributed computer system including multiple servers or computers that interoperate to perform one or more of the processes and functionalities associated with the disclosed embodiments. In some embodiments vehicle reservation curation system 320 may be one or more servers from a serverless or scaling server system. In some embodiments, the vehicle reservation curation system 320 may further include a peripheral interface, a transceiver, a mobile network interface in communication with the processor 310, a bus configured to facilitate communication between the various components of the vehicle reservation curation system 320, and a power source configured to power one or more components of the vehicle reservation curation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the vehicle reservation curation system 320 may include one or more storage devices configured to store information used by the processor 310 (or other components) to perform certain functions related to the disclosed embodiments. In one example, the vehicle reservation curation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The vehicle reservation curation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the vehicle reservation curation system 320 may include the memory 330 that may include one or more programs 350 to perform one or more functions of the disclosed embodiments. For example, in some embodiments, the vehicle reservation curation system 320 may additionally manage dialogue and/or other interactions with the customer via a program 350.

The processor 310 may execute one or more programs 350 located remotely from the vehicle reservation curation system 320. For example, the vehicle reservation curation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a vehicle reservation curation system database 360 for storing related data to enable the vehicle reservation curation system 320 to perform one or more of the processes and functionalities associated with the disclosed embodiments.

The vehicle reservation curation system database 360 may include stored data relating to status data (e.g., average session duration data, location data, idle time between sessions, and/or average idle time between sessions) and historical status data. According to some embodiments, the functions provided by the vehicle reservation curation system database 360 may also be provided by a database that is external to the vehicle reservation curation system 320, such as the database 416 as shown in FIG. 4.

The vehicle reservation curation system 320 may also be communicatively connected to one or more memory devices (e.g., databases) locally or through a network. The remote memory devices may be configured to store information and may be accessed and/or managed by the vehicle reservation curation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The vehicle reservation curation system 320 may also include one or more I/O devices 370 that may comprise one or more interfaces for receiving signals or input from devices and providing signals or output to one or more devices that allow data to be received and/or transmitted by the vehicle reservation curation system 320. For example, the vehicle reservation curation system 320 may include interface components, which may provide interfaces to one or more input devices, such as one or more keyboards, mouse devices, touch screens, track pads, trackballs, scroll wheels, digital cameras, microphones, sensors, and the like, that enable the vehicle reservation curation system 320 to receive data from a user (such as, for example, via the user device 402).

In examples of the disclosed technology, the vehicle reservation curation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The vehicle reservation curation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The vehicle reservation curation system 320 may be configured to adjust model parameters during training. Model parameters may include weights, coefficients, offsets, or the like. Training may be supervised or unsupervised. According to some embodiments, the vehicle reservation curation system 320 may utilize one or more machine learning models to determine, for example, whether a selected vehicle is an electric vehicle, whether an accommodation has electric vehicle charging facilities, whether the selected vehicle is likely to require charging during a user's trip and/or whether the selected vehicle correlates with the selected accommodation (i.e., whether they are part of the same trip).

The vehicle reservation curation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The vehicle reservation curation system 320 may be configured to optimize statistical models using known optimization techniques.

Furthermore, the vehicle reservation curation system 320 may include programs configured to retrieve, store, and/or analyze properties of data models and datasets. For example, vehicle reservation curation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The vehicle reservation curation system 320 may include algorithms to determine a data type, key-value pairs, row-column data structure, statistical distributions of information such as keys or values, or other property of a data schema may be configured to return a statistical profile of a dataset (e.g., using a data-profiling model). The vehicle reservation curation system 320 may be configured to implement univariate and multivariate statistical methods. The vehicle reservation curation system 320 may include a regression model, a Bayesian model, a statistical model, a linear discriminant analysis model, or other classification model configured to determine one or more descriptive metrics of a dataset. For example, vehicle reservation curation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The vehicle reservation curation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, vehicle reservation curation system 320 may be configured to generate a similarity metric representing a measure of similarity between data in a dataset. A similarity metric may be based on a correlation, covariance matrix, a variance, a frequency of overlapping values, or other measure of statistical similarity.

The vehicle reservation curation system 320 may be configured to generate a similarity metric based on data model output, including data model output representing a property of the data model. For example, vehicle reservation curation system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The vehicle reservation curation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The vehicle reservation curation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, vehicle reservation curation system 320 is configured to generate and/or train a classification model to classify a dataset, consistent with disclosed embodiments.

The vehicle reservation curation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models. According to some embodiments, the vehicle reservation curation system 320 may utilize one or more prediction models to determine, for example, whether a selected vehicle is an electric vehicle, whether an accommodation has electric vehicle charging facilities, whether the selected vehicle is likely to require charging during a user's trip and/or whether the selected vehicle correlates with the selected accommodation (i.e., whether they are part of the same trip).

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the vehicle reservation mismatch detection system may analyze information applying machine-learning methods.

According to some embodiments, as described previously above, the vehicle reservation curation system 320 may utilize natural language processing techniques to determine the meaning of text, to, for example, aid in making determinations such as whether a selected vehicle is an electric vehicle, whether a selected accommodation includes electric vehicle charging facilities, and any other such determination that may be desired as described herein. The vehicle reservation curation system 320 may be configured to analyze text from a user's emails, electronic calendar, text messages or other electronic data that the user has given access to. The vehicle reservation curation system 320 may be configured to use web crawler/scraping techniques to obtain text from websites, such as vehicle/accommodation reservation websites, hotel or other accommodation websites, vehicle rental organization websites, or vehicle and/or accommodation review websites, which may be helpful in aiding the system in making such determinations.

As will be understood by those of skill in the art, natural language processing techniques can allow computing devices to extract meaning from words, such as words spoken and recorded in the speech data. Natural language processing can involve data preprocessing, which can place the data in a form more easily processed by a machine learning model, and can include techniques such as tokenization, stop word removal and part-of-speech tagging. After speech data has been pre-processed, it can be processed to extract meaning by using one or more natural language processing algorithms, such as for example a machine-learning based system that can perform tasks based on training data the model is trained on and then can be adjusted and refined as more data is fed into the model. Natural language processing algorithms can use a combination of machine learning, deep learning and neural networks to extract meaning from words.

Natural language processing techniques can involve examining syntax and semantic analysis to determine the meaning of words. Natural language programming can use syntax to assess meaning from language by using various techniques, such as parsing, word segmentation, sentence breaking morphological segmentation, and stemming. Semantics analysis can include techniques such as word sense disambiguation, named entity recognition, natural language generation and natural language understanding. Rule extraction and discovery may involve extracting general inference rules in text, audio, video, or other media.

As described previously above, the vehicle reservation curation system 320 may be configured to make various determinations, such as whether a selected vehicle is an electric vehicle, whether a selected accommodation includes electric vehicle charging facilities, whether the selected vehicle is likely to require charging at a selected accommodation (e.g., based on the timing/duration of a user's trip), whether there is a mismatch between a selected vehicle and a selected accommodation, and whether comparable alternative vehicles and/or accommodations are available. The vehicle reservation curation system 320 may also be configured to generate one or more graphical user interfaces to be displayed to a user (e.g., via user device 402) that may warn the user that a vehicle reservation mismatch has been detected and provide the user the opportunity to modify the reservation in order to rectify the mismatch.

According to some embodiments, the vehicle reservation curation system 320 may be integrated as part of a website or software application reservation service that can monitor a user's inputs, determine whether there is a vehicle reservation mismatch and provide a warning/suggested alternatives to the user in near real-time (e.g., via presenting a pop-up GUI on user device 402). In some embodiments, the vehicle reservation curation system 320 may be integrated as part of the functionality of a web browser (e.g., via a plug-in or extension) that can similarly monitor a user's inputs into a reservation system, determine whether there is a vehicle reservation mismatch and provide a warning/suggested alternatives to the user in near real-time. In some embodiments, the vehicle reservation curation system 320 may be configured to determine that a vehicle reservation mismatch has occurred after the reservation has already been made by examining information provided in confirmation emails/texts or other electronic records. In such instances, the vehicle reservation curation system 320 may provide a warning of the mismatch to the user via an email or text message that may provide the user with the ability to modify the reservation to rectify the mismatch.

While the vehicle reservation curation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the vehicle reservation curation system 320 may include a greater or lesser number of components than those illustrated.

FIG. 4 is a block diagram of an example system that may be used to view and interact with trip planning system 408, according to an example implementation of the disclosed technology. The components and arrangements shown in FIG. 4 are not intended to limit the disclosed embodiments as the components used to implement the disclosed processes and features may vary. As shown, trip planning system 408 may interact with a user device 402 via a network 406. In certain example implementations, the trip planning system 408 may include a local network 412, a vehicle reservation curation system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the trip planning system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the trip planning system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The trip planning system 408 may be associated with and optionally controlled by one or more entities such as a business, corporation, individual, partnership, or any other entity that provides one or more of goods, services, and consultations to individuals such as customers. In some embodiments, the trip planning system 408 may be controlled by a third party on behalf of another business, corporation, individual, partnership. The trip planning system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a vehicle and/or accommodation reservation website that may provide data to the vehicle reservation curation system 320 for the purpose of determining whether a vehicle reservation mismatch is reflected by a set of reservation data (i.e., vehicle reservation data and accommodation reservation data). According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the trip planning system 408 to interact with one another and to connect to the network 406 for interacting with components in the system 400 environment. In some embodiments, the local network 412 may include an interface for communicating with or linking to the network 406. In other embodiments, certain components of the trip planning system 408 may communicate via the network 406, without a separate local network 406.

The trip planning system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access trip planning system 408 using the cloud computing environment. User device 402 may be able to access trip planning system 408 using specialized software. The cloud computing environment may eliminate the need to install specialized software on user device 402.

In accordance with certain example implementations of the disclosed technology, the trip planning system 408 may include one or more computer systems configured to compile data from a plurality of sources the vehicle reservation curation system 320, web server 410, and/or the database 416. The vehicle reservation curation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Although the preceding description describes various functions of a web server 410, a vehicle reservation curation system 320, a database 416, a call center server 430, and agent device 440 in some embodiments, some or all of these functions may be carried out by a single computing device.

EXAMPLE USE CASE

The following example use case describes an example of a typical user flow pattern. This section is intended solely for explanatory purposes and not in limitation.

In one example, a user that is planning a trip to another city visits a trip reservation website that allows the user to specify a vehicle rental and a hotel rental corresponding to the dates of the trip. The user selects a particular make and model vehicle and selects a room at a particular hotel chain. Prior to reaching a check-out screen where the reservation is finalized, the system (e.g., vehicle reservation curation system 320) determines whether the selected vehicle is an electric vehicle, whether it is likely to require charging during the trip and whether the selected accommodation includes electric vehicle charging facilities. If there is a reservation mismatch (i.e., the user has selected an electric vehicle that is likely to require charging, but the selected accommodation does not have electric vehicle charging facilities), the system may prevent the user from finalizing the reservation or display a warning to the user to let them know that the mismatch is present to warn the user that the selected vehicle is likely to run out of electric charge during their trip if they proceed with the reservations as currently selected. The prompt can provide suggested alternative vehicles and/or accommodations to select from to modify the reservation in order to avoid the mismatch or the user may search and input their own alternative, if desired. The system can be implemented as a part of the reservation website or as part of a web browser that monitors the user's inputs on a reservation website.

In another example, the user has already separately booked a vehicle reservation and an accommodation reservation. In this case, the system may scan a user's emails to look for confirmation emails from the reservation websites that provide details about the reservations of each. The system can similarly determine whether there is a mismatch between a vehicle and accommodation reservation for a single trip, and if so, can provide the user with a similar warning message, for example, via email or text message. Although the user has already made the reservations in this case, the system may nonetheless provide the warning to the user to allow them to cancel or modify their reservations to avoid a situation where they have an electric vehicle that runs out of battery and no place to charge it. The warning that is sent to the user (e.g., via email) may include suggested alternatives/modifications to the reservations that the user may select to automatically modify their reservation.

In some examples, disclosed systems or methods may involve one or more of the following clauses:

Clause 1: A vehicle reservation curation system comprising: one or more processors; memory in communication with the one or more processors and storing instructions that are configured to cause the vehicle reservation curation system to: receive vehicle data comprising first timing data and indicating a selected vehicle; determine, from the vehicle data, that the selected vehicle is electric; receive accommodation data comprising second timing data and indicating a selected accommodation; determine, from comparing the first timing data to the second timing data, that the selected vehicle will likely require charging at the selected accommodation; determine whether the accommodation data associated with the selected accommodation comprises an indication of electric vehicle charging facilities; responsive to determining that the selected accommodation does not provide the indication of electric vehicle charging facilities: generate a first graphical user interface warning that no charging station is available for the selected vehicle at the selected accommodation; and transmit the first graphical user interface to a user device for display.

Clause 2: The vehicle reservation curation system of clause 1, wherein the memory stores further instructions that are configured to cause the vehicle reservation curation system to prevent a reservation with the selected accommodation and the selected vehicle in response to determining that the selected accommodation does not provide electric vehicle charging facilities.

Clause 3: The vehicle reservation curation system of clause 1, wherein the system determines whether the accommodation data associated with the selected accommodation comprises the indication of electric vehicle charging facilities by using natural language processing to parse data of a web page or listing.

Clause 4: The vehicle reservation curation system of clause 3, wherein the vehicle reservation curation system is part of a travel reservation portal, a browser extension, or combinations thereof, and wherein the selected accommodation is a non-traditional accommodation.

Clause 5: The vehicle reservation curation system of clause 1, wherein the first graphical user interface suggests changes comprising a different accommodation with electric vehicle charging facilities or a hybrid electric vehicle option.

Clause 6: The vehicle reservation curation system of clause 1, wherein the system determines that the selected vehicle is electric using a first machine learning model.

Clause 7: The vehicle reservation curation system of clause 1, wherein the system determines that the selected vehicle will require charging using a second machine learning model.

Clause 8: The vehicle reservation curation system of clause 7, wherein the second machine learning model uses inputs of the vehicle data to determine a vehicle type, the accommodation data to determine an accommodation type, the first timing data, and the second timing data.

Clause 9: The vehicle reservation curation system of clause 1, wherein the system determines that the selected vehicle will require charging using coded rules.

Clause 10: The vehicle reservation curation system of clause 1, wherein the system utilizes metatags to determine whether the accommodation data associated with the selected accommodation comprises the indication of electric vehicle charging facilities.

Clause 11: A vehicle reservation curation system comprising: one or more processors; memory in communication with the one or more processors and storing instructions that are configured to cause the vehicle reservation curation system to: receive vehicle data from a first email comprising first timing data and indicating a selected vehicle; determine, from the vehicle data and first external vehicle data, that the selected vehicle is electric; receive accommodation data from a second email comprising second timing data and indicating a selected accommodation; determine, from comparing the first timing data to the second timing data, that the selected vehicle will likely require charging at the selected accommodation; determine whether the accommodation data associated with the selected accommodation comprises an indication of electric vehicle charging facilities; responsive to determining that the selected accommodation does not provide the indication of electric vehicle charging facilities: generate a first graphical user interface warning that no charging station is available for the selected vehicle at the selected accommodation; and transmit the first graphical user interface to a user device for display.

Clause 12: The vehicle reservation curation system of clause 11, wherein the memory stores further instructions that are configured to cause the vehicle reservation curation system to: responsive to determining that the selected accommodation does not provide the indication of electric vehicle charging facilities: determine whether an alternative accommodation that provides electric vehicle charging facilities is available; and responsive to determining that the alternative accommodation is available: change the selected accommodation to the alternative accommodation.

Clause 13: The vehicle reservation curation system of clause 11, wherein the memory stores further instructions that are configured to cause the vehicle reservation curation system to: responsive to determining that the selected accommodation does not provide the indication of electric vehicle charging facilities: determine whether an alternative accommodation that provides electric vehicle charging facilities is available; responsive to determining that the alternative accommodation is available: generate a second graphical user interface comprising a message to a user regarding switching to the alternative accommodation; and transmit the second graphical user interface to the user device.

Clause 14: The vehicle reservation curation system of clause 13, wherein the memory stores further instructions that are configured to cause the vehicle reservation curation system to: responsive to determining that the alternative accommodation is not available: change the selected vehicle to a hybrid electric vehicle or internal combustion engine vehicle.

Clause 15: The vehicle reservation curation system of clause 13, wherein the memory stores further instructions that are configured to cause the vehicle reservation curation system to: responsive to determining that the alternative accommodation is not available: generate a third graphical user interface asking the user if they would like to switch to an alternative vehicle; and transmit the third graphical user interface to the user device.

Clause 16: The vehicle reservation curation system of clause 11, wherein the first graphical user interface is transmitted to the user device for display via email.

Clause 17: The vehicle reservation curation system of clause 11, wherein the first external vehicle data and external accommodation data are acquired by a machine learning model compiling data from a number of different users.

Clause 18: A vehicle reservation curation system comprising: one or more processors; memory in communication with the one or more processors and storing instructions that are configured to cause the vehicle reservation curation system to: receive vehicle data comprising first timing data and indicating a selected vehicle; determine, from the vehicle data, that the selected vehicle is electric; receive accommodation data comprising second timing data and indicating a selected accommodation; determine, from comparing the first timing data to the second timing data, that the selected vehicle correlates with the selected accommodation using a first machine learning model; determine whether the accommodation data associated with the selected accommodation comprises an indication of electric vehicle charging facilities; responsive to determining that the selected accommodation does not provide the indication of electric vehicle charging facilities: generate a first graphical user interface warning that no charging station is available for the selected vehicle at the selected accommodation; and transmit the first graphical user interface to a user device for display.

Clause 19: The vehicle reservation curation system of clause 18, wherein the vehicle data and the accommodation data are received from transaction data from a transaction card.

Clause 20: The vehicle reservation curation system of clause 18, wherein the memory stores further instructions that are configured to cause the vehicle reservation curation system to: determine, after a predetermined period of time, whether the selected accommodation or the selected vehicle have been changed; responsive to determining that the selected accommodation or the selected vehicle have not been changed: generate a second graphical user interface warning reminding a user that no charging station is available for the selected vehicle at the selected accommodation; and transmit the second graphical user interface to the user device for display.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IOT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle reservation curation system comprising:
   one or more processors;
   memory in communication with the one or more processors and storing instructions that are configured to cause the vehicle reservation curation system to:
      monitor, via a web browser extension, whether a user is accessing a reservation website and detect vehicle data as it is entered into the reservation website by the user;
      receive, via the web browser extension, the vehicle data as it is entered into the reservation website by the user, the vehicle data comprising first timing data and indicating a selected vehicle, wherein the first timing data indicates a period of time for which the selected vehicle is requested for reservation;
      determine, from the vehicle data, that the selected vehicle is electric;
      receive accommodation data comprising second timing data and indicating a selected accommodation, wherein the second timing data indicates a period of time for which the selected accommodation is requested for reservation;
      determine, from comparing the first timing data to the second timing data, that the selected vehicle will likely require charging at the selected accommodation;
      determine whether the accommodation data associated with the selected accommodation comprises an indication of electric vehicle charging facilities;
      responsive to determining that the selected accommodation does not provide the indication of electric vehicle charging facilities:
      generate a first graphical user interface warning that no charging station is available for the selected vehicle at the selected accommodation, wherein the first graphical user interface provides a suggestion to modify a reservation, the suggestion comprising an alternative accommodation having electric vehicle charging facilities or an alternative vehicle; and
      transmit the first graphical user interface to a user device for display in near real-time.

2. The vehicle reservation curation system of claim 1, wherein the memory stores further instructions that are configured to cause the vehicle reservation curation system to prevent a reservation with the selected accommodation and the selected vehicle in response to determining that the selected accommodation does not provide electric vehicle charging facilities.

3. The vehicle reservation curation system of claim 1, wherein the system determines whether the accommodation data associated with the selected accommodation comprises the indication of electric vehicle charging facilities by using natural language processing to parse data of a web page or listing.

4. The vehicle reservation curation system of claim 3, wherein the vehicle reservation curation system is part of a travel reservation portal, a browser extension, or combinations thereof, and wherein the selected accommodation is a non-traditional accommodation.

5. The vehicle reservation curation system of claim 1, wherein the alternative vehicle comprises an hybrid electric vehicle or internal combustion engine vehicle.

6. The vehicle reservation curation system of claim 1, wherein the system determines that the selected vehicle is electric using a first machine learning model.

7. The vehicle reservation curation system of claim 1, wherein the system determines that the selected vehicle will require charging using a second machine learning model.

8. The vehicle reservation curation system of claim 7, wherein the second machine learning model uses inputs of the vehicle data to determine a vehicle type, the accommodation data to determine an accommodation type, the first timing data, and the second timing data.

9. The vehicle reservation curation system of claim 1, wherein the system determines that the selected vehicle will require charging using coded rules.

10. The vehicle reservation curation system of claim 1, wherein the system utilizes metatags to determine whether the accommodation data associated with the selected accommodation comprises the indication of electric vehicle charging facilities.

11. A vehicle reservation curation system comprising:
    one or more processors;
    memory in communication with the one or more processors and storing instructions that are configured to cause the vehicle reservation curation system to:
       monitor, via a web browser extension, whether a user is accessing a reservation website and detect vehicle data as it is entered into the reservation website by the user;
       receive, via the web browser extension, the vehicle data as it is entered into the reservation website by the user, the vehicle data comprising first timing data and indicating a selected vehicle, wherein the first timing data indicates a period of time for which the selected vehicle is requested for reservation;
       determine, from the vehicle data, that the selected vehicle is electric;
       receive accommodation data comprising second timing data and indicating a selected accommodation, wherein the second timing data indicates a period of time for which the selected accommodation is requested for reservation;

determine, from comparing the first timing data to the second timing data, that the selected vehicle correlates with the selected accommodation using a first machine learning model;

determine whether the accommodation data associated with the selected accommodation comprises an indication of electric vehicle charging facilities;

responsive to determining that the selected accommodation does not provide the indication of electric vehicle charging facilities:

generate a first graphical user interface warning that no charging station is available for the selected vehicle at the selected accommodation, wherein the first graphical user interface provides a suggestion to modify a reservation, the suggestion comprising an alternative accommodation having electric vehicle charging facilities or an alternative vehicle; and transmit the first graphical user interface to a user device for display in near real-time.

12. The vehicle reservation curation system of claim 11, wherein the vehicle data and the accommodation data are received from transaction data from a transaction card.

13. The vehicle reservation curation system of claim 11, wherein the memory stores further instructions that are configured to cause the vehicle reservation curation system to:

determine, after a predetermined period of time, whether the selected accommodation or the selected vehicle have been changed;

responsive to determining that the selected accommodation or the selected vehicle have not been changed:

generate a second graphical user interface warning reminding the user that no charging station is available for the selected vehicle at the selected accommodation; and transmit the second graphical user interface to the user device for display.

14. A method comprising:

monitoring, via a web browser extension, whether a user is accessing a reservation website and detecting vehicle data as it is entered into the reservation website by the user;

receiving, via the web browser extension, the vehicle data as it is entered into the reservation website by the user, the vehicle data comprising first timing data and indicating a selected vehicle, wherein the first timing data indicates a period of time for which the selected vehicle is requested for reservation;

determining, from the vehicle data, that the selected vehicle is electric;

receiving accommodation data comprising second timing data and indicating a selected accommodation, wherein the second timing data indicates a period of time for which the selected accommodation is requested for reservation;

determining, from comparing the first timing data to the second timing data, that the selected vehicle will likely require charging at the selected accommodation;

determining whether the accommodation data associated with the selected accommodation comprises an indication of electric vehicle charging facilities;

responsive to determining that the selected accommodation does not provide the indication of electric vehicle charging facilities:

generating a first graphical user interface warning that no charging station is available for the selected vehicle at the selected accommodation, wherein the first graphical user interface provides a suggestion to modify a reservation, the suggestion comprising an alternative accommodation electric vehicle having charging facilities or an alternative vehicle; and transmitting the first graphical user interface to a user device for display in near real-time.

15. The method of claim 14, further comprising preventing a reservation with the selected accommodation and the selected vehicle in response to determining that the selected accommodation does not provide electric vehicle charging facilities.

16. The method of claim 14, wherein determining whether the accommodation data associated with the selected accommodation comprises the indication of electric vehicle charging facilities is performed using natural language processing to parse data of a web page or listing.

17. The method of claim 16, wherein the selected accommodation is a non-traditional accommodation.

18. The method of claim 14, wherein the alternative vehicle comprises an hybrid electric vehicle or internal combustion engine vehicle.

19. The method of claim 14, wherein determining that the selected vehicle is electric is performed using a first machine learning model.

20. The method of claim 14, wherein determining that the selected vehicle will require charging is performed using a second machine learning model.

* * * * *